United States Patent [19]

Hollins

[11] 4,096,469

[45] Jun. 20, 1978

[54] HAZARD WARNING SYSTEM FOR CERTAIN TYPES OF MOTOR VEHICLES

[76] Inventor: Jesse R. Hollins, 40 Stoner Ave., Great Neck, N.Y. 11021

[21] Appl. No.: 660,380

[22] Filed: Feb. 23, 1976

Related U.S. Application Data

[63] Continuation-in-part of Ser. No. 580,562, May 27, 1975, abandoned.

[51] Int. Cl.² .............................................. B60Q 1/46
[52] U.S. Cl. ................................. 340/81 R; 340/72
[58] Field of Search ..................... 340/72, 74, 78, 80, 340/81 R, 81 F; 315/82, 83

[56] References Cited

U.S. PATENT DOCUMENTS

| 3,325,784 | 6/1967 | Erdelitsch et al. | 340/74 |
| 3,740,714 | 6/1973 | Ballou | 340/81 F |
| 3,745,524 | 7/1973 | Suzuki | 340/81 F |
| 3,821,702 | 6/1974 | Mogi | 340/81 R |
| 3,873,967 | 3/1975 | Swoboda | 340/81 R |
| 3,925,757 | 12/1975 | Kimmelman | 340/80 X |

*Primary Examiner*—Donald J. Yusko
*Attorney, Agent, or Firm*—Kirschstein, Kirschstein, Ottinger & Cobrin

[57] ABSTRACT

An improved hazard warning system for certain types of motor vehicles (especially commercial motor vehicles) wherein when the hazard warning system is in operation, the clearance/marker and identification lights are intermittently flashed along with the flashing of the left and right front and left and right rear signal lights.

1 Claim, 6 Drawing Figures

FIG. 2
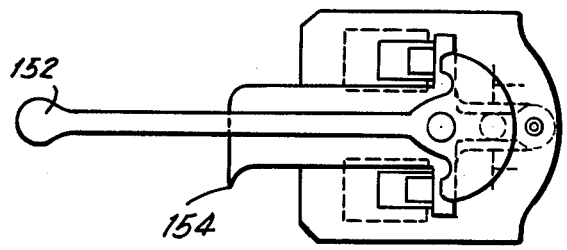
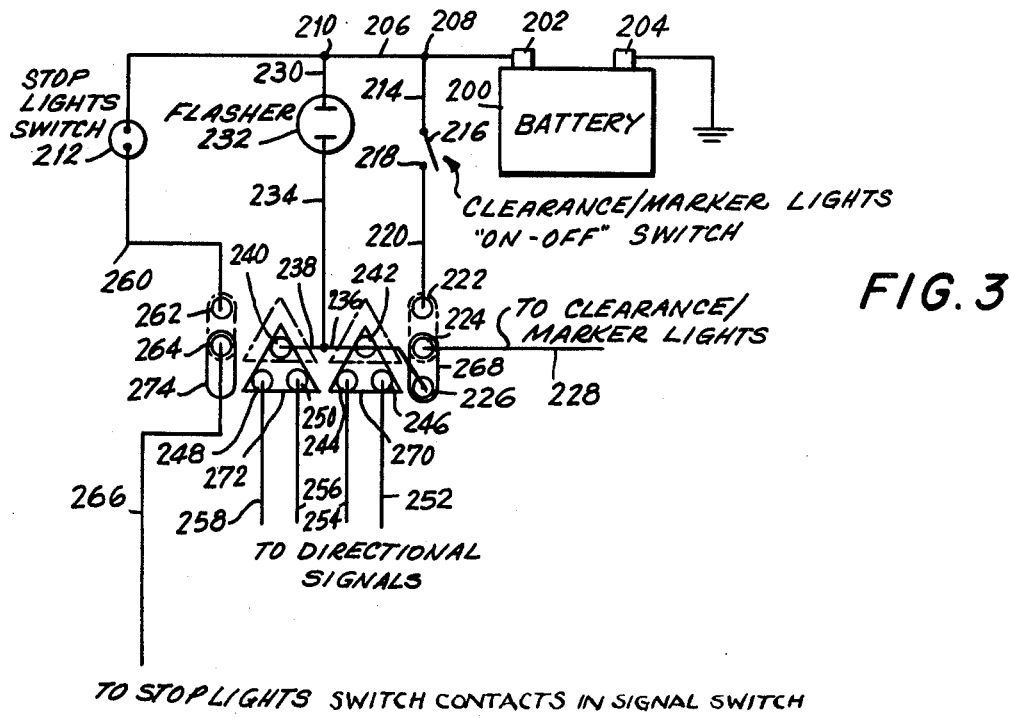
FIG. 3
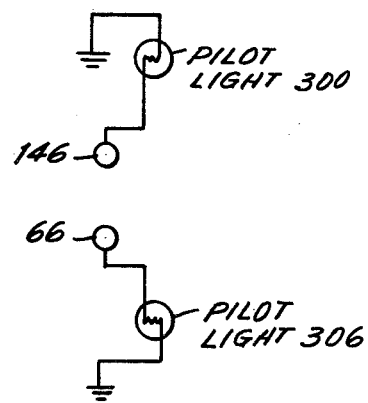
FIG. 4

HAZARD WARNING SYSTEM FOR CERTAIN TYPES OF MOTOR VEHICLES

CROSS REFERENCE TO RELATED APPLICATIONS

This application is a continuation-in-part of my co-pending application, Ser. No. 580,562, filed May 27, 1975 and entitled "IMPROVED HAZARD WARNING SYSTEM FOR CERTAIN TYPES OF MOTOR VEHICLES," and now abandoned.

BACKGROUND OF THE INVENTION

1. Field of the Invention

Improved Hazard Warning System for Certain Types of Motor Vehicles.

2. Description of the Prior Art

Nearly all commercial vehicles are equipped with a directional signaling system. The signal lights located at the rear of the vehicle have their light output greatly reduced by road dust and mud. Frequently, the lamp brackets are distorted, thus moving the lamps, as when the vehicle backs into a loading dock, resulting in the light from the lamps being misdirected so that the light rays are less visible than they normally would be.

As a result of the aforesaid factors, the hazard warning system, when placed in operation, often operates at less than maximum efficiency. This, of course, is extremely undesirable since many vehicle operators are extremely dependent upon the efficiency of the hazard warning system as when their vehicle is standing, double parked for unloading, or loading, or when standing on the highway when disabled.

SUMMARY OF THE INVENTION

1. Purposes of the Invention

It is an object of the present invention to provide an improved hazard warning system for vehicles that are equipped with clearance/marker and identification lamps.

Still a further object of the present invention is to provide an improved hazard warning system for commercial vehicles such as trucks, buses and tractor trailer units.

Other objects of the invention, in part, will be obvious and, in part, will be pointed out hereinafter.

2. Brief Description of the Invention

According to the present invention, the foregoing as well as other objects are achieved by having the clearance/marker and identification lights which certain vehicles are equipped with flash in synchronization with the signal lights when the hazard warning system is in operation. As a result, the vehicle will easily be seen when the hazard warning system is in operation, particularly during darkness or in inclement weather, thereby providing greater safety for vehicle drivers.

BRIEF DESCRIPTION OF THE DRAWINGS

In the drawings:

FIG. 2 is a sectional view showing the combined directional signal-hazard warning lever utilized in the present invention and known in the prior art;

FIG. 3 is a schematic illustration of an alternate embodiment of the present invention;

FIG. 4 shows an alternate pilot light arrangement;

DESCRIPTION OF THE PREFERRED EMBODIMENTS

Figure 1:
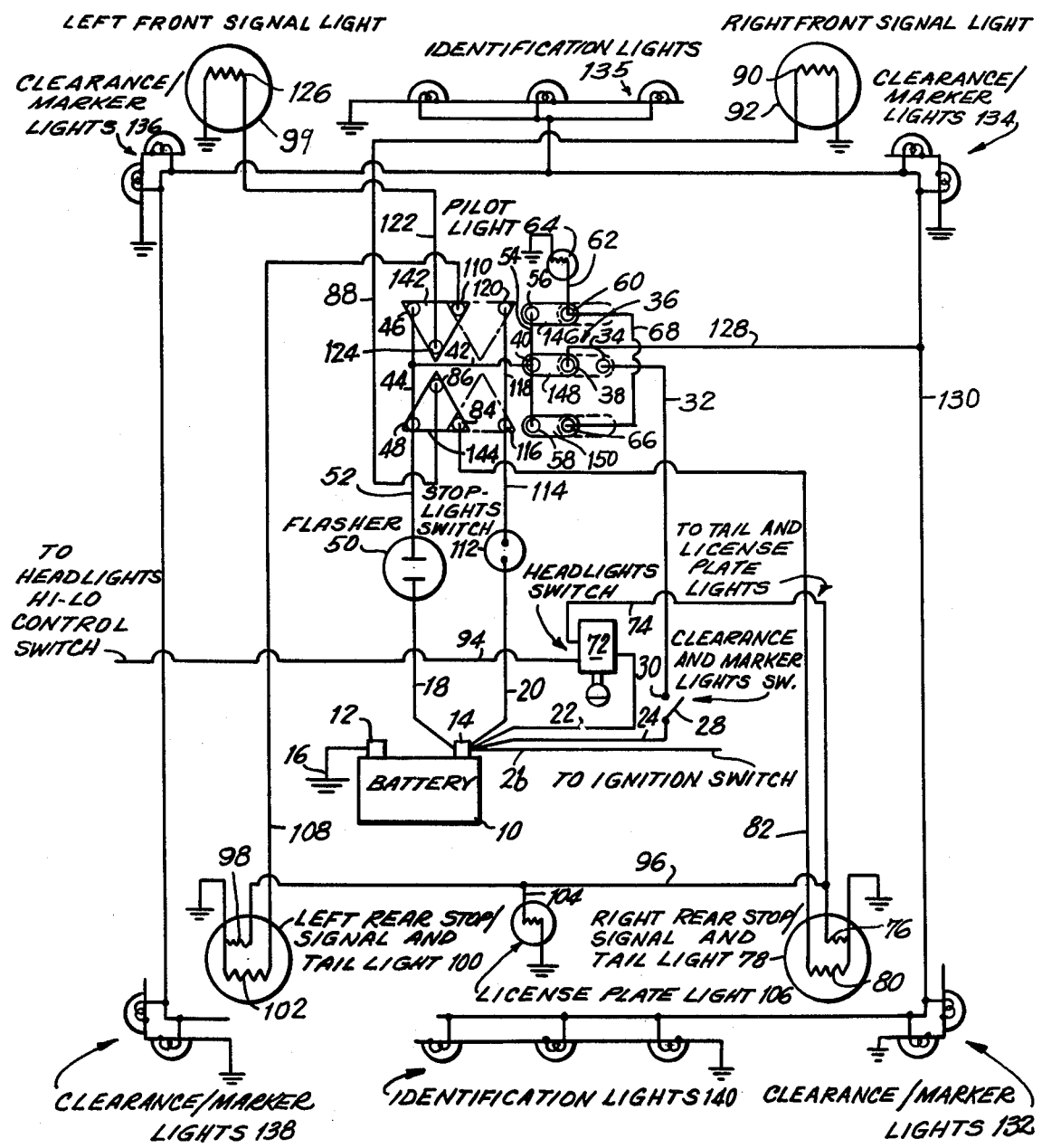
FIG. 1 is a schematic illustration of the system according to the present invention.

In FIG. 1 of the drawings an embodiment of the present invention is shown and includes a storage battery 10 having a negative post 12 and a positive post 14. A wire 16 connects negative post 12 to ground. Connected to positive post 14 are wires 18, 20, 22, 24 and 26. Wire 26 is connected to the ignition switch.

Wire 24 is connected to a clearance/marker and identification light control switch lever 28. Switch lever 28 cooperates with contact terminal 30 as will hereinafter be described. One end of a wire 32 is connected to contact terminal 30 and the other end to a contact terminal 34 which is part of the clearance/marker and identification light swith 36. Often, clearance/marker and identification lights are wired directly to the headlight switch (parking/taillight tap) so that switch 28 would be eliminated. A contact terminal 38 which is also part of the clearance/marker and identification light switch cooperates with contact terminal 34 as will hereinafter be described. A contact terminal 40 cooperates with contact terminal 38 as will hereinafter be described and one end of a wire 42 is connected to contact terminal 40. The other end of wire 42 is connected to wire 44 which in turn is connected to contact terminals 46 and 48.

One terminal of a flasher 50 is connected to wire 18 and the other terminal of the flasher, via wire 52, is connected to contact terminal 48.

A wire 54 connects contact terminals 56, 40 and 58. A contact terminal 60 cooperates with contact terminal 56 as will hereinafter be described and is connected by wire 62 to pilot light bulb 64 which is grounded as indicated in the drawings. Pilot light 64 when flashing indicates that a directional signal is on or the hazard warning system is in operation.

A contact terminal 66 cooperates with contact terminal 58.

Wire 68 connects contact terminals 60 and 66.

The operation of the signal switch is well known in the art. However, the pilot light arrangement is new as the pilot light operates off a flasher that does not include a relay and relay armature. The pilot light flashes simultaneously with the flashing of the right or left directional signal or when the hazard warning system is in operation eliminating the need for a three-terminal flasher.

Wire 22 is connected to headlight switch 72. A wire 74 is connected to headlight switch 72 and to filament 76 which is the low wattage filament in the right rear lamp housing 78. Also located in right rear lamp housing 78 is a high wattage filament 80. Filaments 78 and 80 are grounded as schematically shown in FIG. 1.

Low wattage filament 76 is for taillight illumination whereas high wattage filament 80 is for directicnal signaling and/or stop signaling. The parking light wiring is not shown as parking lights are usually separate units when installed on certain vehicles.

A wire 82 is connected to high wattage filament 80 and to contact terminal 84.. Contact terminal 86 cooperates with contact terminal 84 as will hereinafter be described and connected thereto is one end of a wire 88. The other end of wire 88 is connected to filament 90 in the right front lamp housing 92 which is used for signaling purposes. As is schematically shown, filament 90 is grounded.

One end of a wire 94 is connected to a contact in the headlight switch 72 with the other end of the wire connected to a high/low beam control switch which is not shown in the drawings.

One end of a wire 96 is connected to wire 74 with the other end of the wire connected to the low wattage (taillight) filament 98 in the left rear lamp housing 100. Also located in the left rear lamp housing 100 is a high wattage (flashing signal and/or steady stop signaling) filament 102. Filaments 98 and 102 are grounded as schematically shown in the drawings.

One end of a wire 104 is connected to wire 96 with the other end of wire 104 connected to the license plate light 106 which is grounded as schematically shown in the drawings.

One end of a wire 108 is connected to filament 102 with the other end of wire 108 being connected to contact terminal 110.

One end of a wire 20 is connected to a terminal of stop light switch 112 which is closed upon the vehicle brake pedal being depressed. One end of a wire 114 is connected to the other terminal of stop light switch 112 with the other end of said wire being connected to terminal 116. A wire 118 at one end is connected to contact terminal 116 and at the other end to contact terminal 120.

One end of a wire 122 is connected to contact terminal 124 and the other end of said wire is connected to filament 126 which is located in the left front lamp housing 99. Filament 126 is grounded as is schematically shown in the drawings and is used for signaling.

One end of a wire 128 is connected to contact terminal 38 and the other end is connected to wire 130. Wire 130 is connected to the clearance/marker lights which are identified by reference numerals 132, 134, 136 and 138. In addition, wire 130 is connected to the identification lights 135 and 140. All of the clearance/marker and identification lights are grounded as is schematically shown in the drawings.

A switch bridge 142 is triangularly shaped and when in the position shown in solid lines, spans contact terminals 46, 110 and 124 and when in the position shown in dotted lines, spans contact terminals 120 and 110.

A switch bridge 144 (also triangularly shaped) when in the position shown in solid lines, spans contact terminals 48, 86 and 84 and when in the position shown in dotted lines, spans contact terminals 84 and 116.

A switch bridge 146 when in the position shown in solid lines spans contact terminals 56 and 60 and when in the position shown in dotted lines spans contact terminal 60 per se.

A switch bridge 148 when in the position shown in solid lines spans contact terminals 38 and 40 and when in the position shown in dotted lines spans contact terminals 38 and 34.

A further switch bridge 150 when in the position shown in solid lines spans contact terminals 58 and 66 and when in the position shown in dotted lines spans contact terminal 66 per se.

In FIG. 2, a combined directional signal hazard warning switch control is illustrated which controls the operation of the hazard warning system and directional signals.. Inasmuch as the structure of FIG. 2 is known in the art as Signal-Stat Model No. 900 (invented by Jesse R. Hollins, the inventor herein) and is shown in U.S. Pat. No. 2,886,743, a detailed description is not set forth herein. However, it is noted that control lever 152 controls the operation of the directional warning system whereas control member 154 controls the hazard warning system.

In normal operation with the hazard warning system inoperative and the directional signals off, all of the switch bridges are in the position shown in dotted lines.

If it is desired to have the left directional signals activated, lever 152 is positioned such that switch bridge 142 assumes the position shown in solid lines. As a consequence, current from the battery through flasher 50 via wire 52, contact terminal 48, wire 44, contact terminal 46, switch bridge 142 and contact terminal 124 causes filament 126 to be intermittently illuminated. Similarly, via contact terminal 110, electric current is periodically directed to filament 102 for intermittent illumination. When the directional signal switch is in a neutral position, switch bridge 142 assumes the position shown in dotted lines.

It is to be appreciated that switch bridge 146 spans terminals 60 and 56 when switch bridge 142 is in the solid line position and pilot light 64 is periodically energized indicating that the left directional signal is on.

In a similar fashion, to activate the right signals the directional signal lever is moved in the opposite direction. Thus switch bridge 144 spans contact terminals 48, 84 and 86 permitting current to flow from the flasher to filaments 90 and 80 causing the filaments to flash. When the directional signal is in the right signaling position, the electric current from the flasher intermittently energizes pilot light 64 by reason of contact terminal 58 being bridged with contact terminal 66.

If it is desired to have the clearance/marker and identification lights steadily illuminated when the hazard warning system is not in use, switch lever 28 is closed.

When the brake pedal is depressed, switch 112 is closed and electric current via wire 114, contact terminals 116 and 120 is directed to filament 102 and filament 80 indicating braking.

When it is desired to activate the hazard warning system, control member 154 is pulled to the left with all of the switch bridges then simultaneously moving to the positions shown in solid lines. Consequently, filaments 126, 190, 80 and 90 are intermittently energized from the current passing through flasher 50. Additionally, with switch bridge 148 spanning contact terminals 40 and 38, the clearance/marker and identification lights are intermittently illuminated from current passing through flasher 50. In addition, the pilot light 64 is also intermittently illuminated indicating the hazard warning system is operating.

Since the clearance/marker and identification lights are mounted at an elevated position, the motor vehicle can be seen from a great distance thereby increasing the effectiveness of the hazard warning system and creating greater safety than in the prior art hazard warning system.

When it is desired to render the hazard warning system inoperative, control 154 is moved to the right (off position) so that all the switch bridges are in the position shown in dotted lines.

A feature of the present invention is when the hazard warning system is on the clearance/marker and identification lights cannot be continuously illuminated by lever 28 being in circuit with contact terminal 30 since contact terminals 34 and 38 are no longer in circuit with each other.

In FIG. 3 of the drawings, a hazard warning system is shown for a commercial motor vehicle which does not include a combined directional signal hazard warning signal arrangement as shown in FIG. 1.

In FIG. 3, a battery 200 is provided which includes a positive post 202 and a grounded negative post 204. A wire 206 connects positive post 202 to wire connections 208, 210 and to stop light switch 212 which is closed when the brake pedal is depressed.

A wire 214 connects contact terminal 208 to clearance/marker and identification lights on/off switch lever 216, said lever cooperating with contact terminal 218. A wire 220 connects contact terminal 218 to contact terminal 222. Contact terminals 222, 224 and 226 cooperate with each other as will hereinafter be described. A wire 228 connects contact terminal 224 to the clearance/marker and identification lights.

A wire 230 connects wire connection 210 to flasher 232. A wire 234 is connected to flasher 232 and to wire connection 236. A wire 238 connects contact terminal 236 to contact terminals 240, 242 and 226. Contact terminals 244 and 246 cooperate with contact terminal 242 as will hereinafter be described. Similarly, contact terminals 248 and 250 cooperate with contact terminal 240 as will hereinafter be described.

Wire 258 is connected to contact terminal 248. The other end of wire 258 is connected to the high wattage filament of one of the bulbs of one of the rear signal lamps. Wire 256 is connected to contact terminal 250 at one end and at the other end wire 256 is connected to the high wattage filament of the bulb at the other of the rear signal lamps. Wire 254 is connected to contact terminal 244 at one end and at the other end is connected to the filament of one of the front signal lamps. Wire 252 is connected to contact terminal 246 at one end and at the other end is connected to the filament of the other front signal lamp.

A wire 260 connects stop light switch 212 to contact terminal 262. A contact terminal 264 cooperates with contact terminal 262 and is connected by wire 266 to the stop lights.

Switch bridge 268 is provided and when in the position shown in solid lines, spans contact terminals 224 and 226 and while in the dotted line position, spans contact terminals 222 and 224. A switch bridge 270 when in the position shown in solid lines spans contact terminals 250, 246 and 242 and when in the position shown in dotted lines, spans contact terminal 242 per se. A further switch bridge 272 when in the solid line position spans contact terminals 240, 248 and 250 and when in the position shown in dotted lines, spans contact terminal 240 per se.

A still further switch bridge 274 when in the solid line position spans contact terminal 264 and when in the dotted line position spans contact terminals 262 and 264.

All of the switch bridges move in unison with each other and are controlled by the hazard warning switch. When the hazard warning system is operating, all of the switch bridges are in the solid position with the clearance/marker and identification lights and directional lights intermittently flashing with the stop light circuit open. When the hazard warning system is inoperative, the switch bridges are in the dotted line position. Still further, when the hazard warning system is operative, the clearance/marker and identification lights cannot be continuously illuminated to detract from the hazard warning system.

In FIG. 4 of the drawings, an embodiment is shown wherein two pilot lights 306 and 300 are provided and are connected to contact terminals 146 and 66 of FIG. 1. Thus, pilot light 300 will flash in unison with the flashing of the left directional signal lights and pilot light 306 will flash in unison with the flashing of the right signals. When the hazard warning system is in operation, both pilot lights 300 and 306 will flash to indicate that the hazard warning system is in operation. Since the pilot lights are not connected to the front signal lamp wiring as in other signaling systems, the front signal lamps may be wired to serve as daytime running lights (See e.g. U.S. Pat. No. 3,337,846 issued to Jesse R. Hollins).

Figure 5:
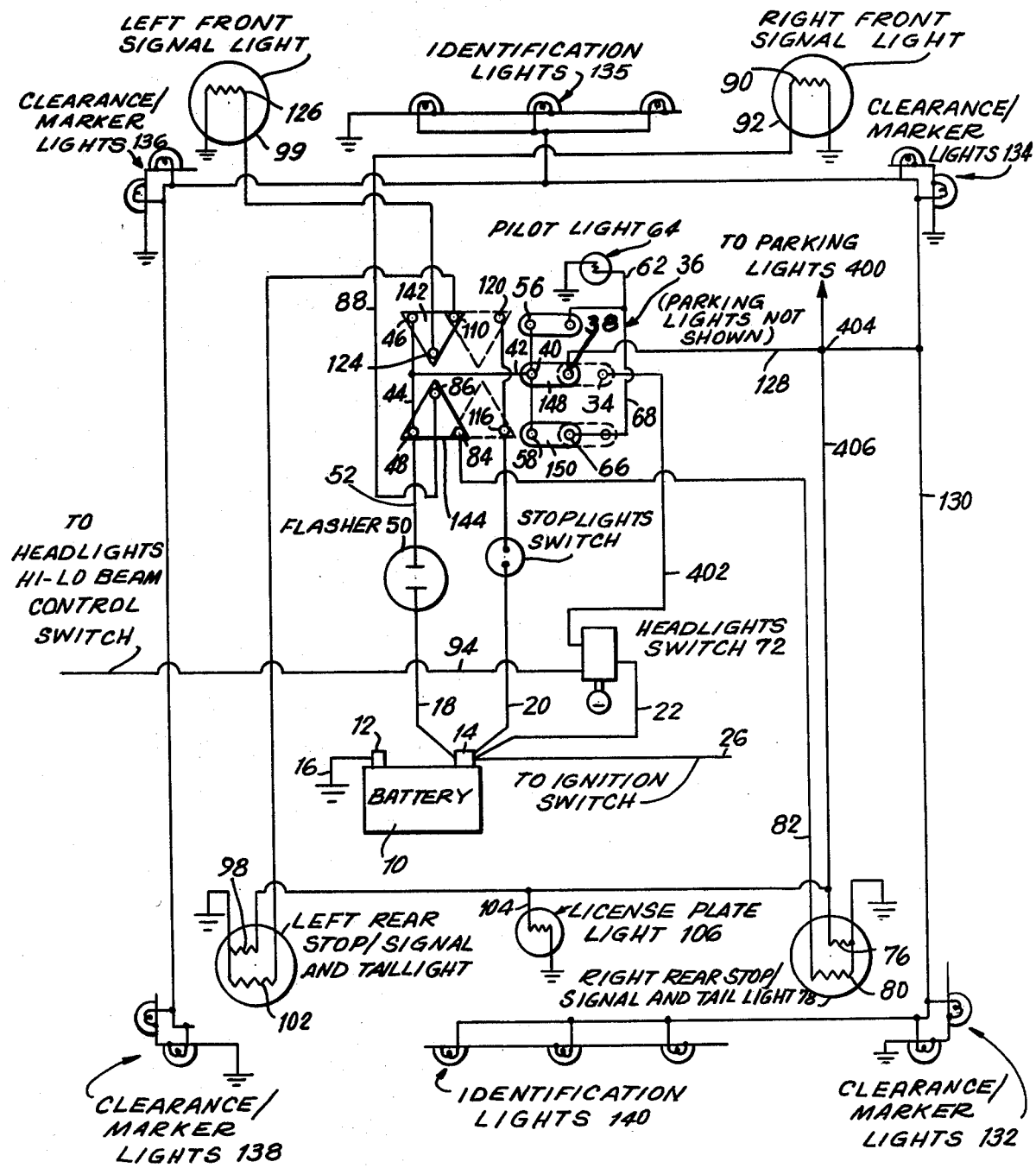
FIG. 5 is a schematic illustration of an alternate embodiment of the present invention.

In FIG. 5 a modified form of the circuit arrangement for a hazard warning system in accordance with the present invention is shown wherein the same elements as the circuit of FIG. 1 are designated by the same reference numerals. In this modified embodiment the parking lights not shown but designated by reference numeral 400, the tail lights 76 and 98, the license plate light 104 as well as the clearance/marker and identification lights 132, 134, 136 and 138 will be intermittently illuminated when the hazard warning system is activated. The circuit is characterized in that the clearance/marker and identification light switch 28 of FIG. 1 is eliminated and the parking lights 400, the tail lights 76 and 198, the license plate light 104 as well as the clearance/marker and identification lights 132, 134, 136 and 138 are all electrically connected to the contact terminal 38 within the switch 36.

As mentioned hereinabove, the headlights switch 72 is connected to the positive post 14 of the battery 10 by wire 22. One end of a wire 402 is connected to a contact terminal (not shown) within the headlights switch 72 and the other end of wire 402 is connected to the contact terminal 34 is the switch 36. The parking lights 400, the tail lights 76 and 98 and the license plate light 106 are electrically connected to wire 128 at terminal 404 by wire 406.

Notwithstanding the modification hereinabove made to the circuit, the stoplights switch, the combined directional signal hazard warning switch control and the pilot light function exactly as described with respect to FIG. 1 and for the sake of brevity will not be described again.

If it is desired to have the parking lights, the tail lights, the license plate light and the clearance/marker and identification lights steadily illuminated when the hazard warning system is not in use, the headlights switch 72 is closed. Since the switch bridge 148 spans the contact terminals 34 and 38 (dotted lines) the lights are placed in circuit with the battery and are illuminated.

To activate the hazard warning system, as mentioned hereinabove, the control member 54 is pulled to the left and all of the switch bridges will move to the positions illustrated in solid lines. Consequently, the filaments 126, 90, 80 and 102 are intermittently energized from the current passing through flasher 50. Further, the switch bridge 148 spans the contact terminals 40 and 38 thereby causing the parking lights, the tail lights, the license plate light and the clearance/marker and identification lights to be intermittently illuminated by current passing through the flasher 50. The pilot light 64 is also intermittently illuminated indicating that the hazard warning system is in operation. Even if the headlights switch 72 is opened, the lights will still flash intermittently since they are being energized through the flasher.

To render the hazard warning system inoperative, the control 154 is moved to the right (off-position) so that the switch bridges are in the position shown in dotted lines. In this position, the tail lights, license plate light, parking lights and the clearance/marker and identification lights will be continuously illuminated so long as the headlight switch 72 is closed.

A feature of the embodiment illustrated in FIG. 5 is that when the hazard warning system is on, the clearance/marker and identification lights cannot be continuously illuminated by the headlights switch 72 being in circuit with the contact terminal 34 since the contact terminals 34 and 38 are no longer in circuit with each other.

The circuit of FIG. 5 is suitable for vehicles already manufactured, and particularly for trailers.

Figure 6:
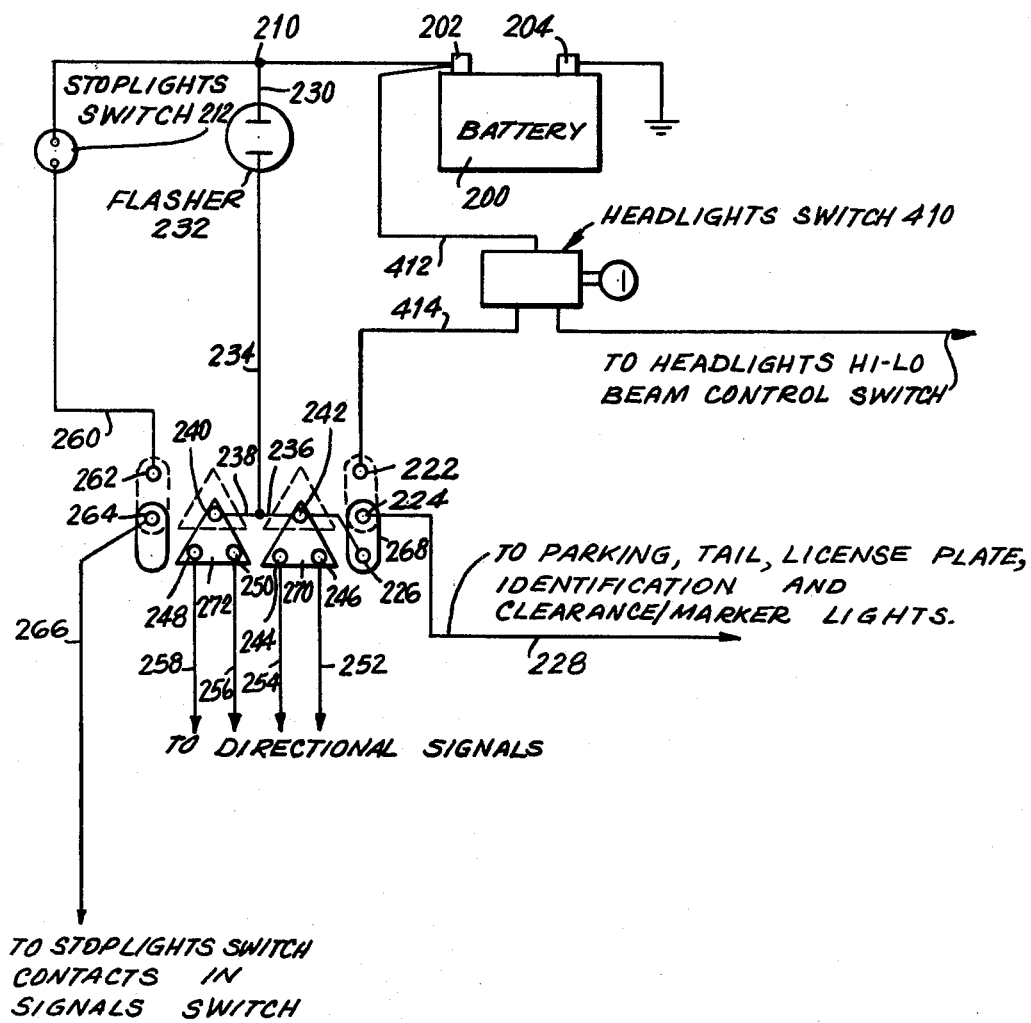
FIG. 6 is a schematic illustration of an alternate embodiment of the present invention.

In FIG. 6 a modification of a hazard warning system for a commercial vehicle which does not include a combined directional signal hazard warning switch control is shown wherein the same elements as the circuit in FIG. 3 are designated by the same reference numerals. In this embodiment the parking lights, the taillights, the license plate light as well as the clearance/marker and identification lights will be intermittently illuminated when the hazard warning system is activated. The circuit is characterized in that the clearance/marker and identification light switch 216 is eliminated and the parking lights, the taillights, the license plate light as well as the clearance/marker and identification lights are electrically connected through wire 228 to the contact terminal 224 within the hazard warning switch.

A headlights switch 410 is connected to the position post 202 of the battery 200 by wire 412. One end of a wire 414 is connected to a contact terminal (not shown) within the headlights switch 410 and the other end of the wire 414 is connected to the contact terminal 222 in the hazard warning switch.

Notwithstanding the modification hereinabove made to the circuit illustrated in FIG. 3, the operation of the stop-lights switch and the switch bridges are exactly as described with reference to FIG. 3 and will not be repeated.

If it is desired to have the parking lights, the tail lights, the license plate light and the clearance/marker and identification lights steadily illuminated when the hazard warning system is not in use, the headlights switch 410 is closed. Since the switch bridge 268 spans the terminal contacts 222 and 224 (dotted line) the lights are placed in circuit with the battery 200 and are illuminated.

When the hazard warning system is operating, the switch bridges are in the solid position and switch bridge 268 spans terminal contacts 224 and 226 so that the parking lights, tail lights, the license plate light and the clearance/marker and identification lights are intermittently illuminated by current passing through flasher 232. Even if the headlights switch 410 is opened, the lights will still flash intermittently since they are being energized through the flasher.

When the hazard warning system is rendered inoperative the switch bridges return to the dotted line position and switch bridge 268 spans the terminal contacts 222 and 224 and the lights will be continuously illuminated so long as the headlights switch 410 is closed.

The feature of the embodiment illustrated in FIG. 6 is that when the hazard warning system is on the parking lights, the tail lights, the license plate light and the clearance/marker and identification lights cannot be continuously illuminated when the headlights switch 410 is closed since contact terminals 222 and 228 are no longer in circuit with each other.

It thus will be seen that there is provided an improved hazard warning system for commercial type motor vehicles which achieves the various objects of the invention and which is well adapted to meet the conditions of practical use.

If the parking lights in FIGS. 5 and 6 are independently wired to the headlights switch, then the parking lights would not be intermittently illuminated when the hazard warning system is put into operation.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. An improved hazard warning system for a commercial motor vehicle comprising a storage battery, said storage battery having a negative post and a positive post, said negative post being electrically connected to ground, said positive post being electrically connected to the ignition switch of said commercial motor vehicle, the switch lever of a clearance/marker and identification light control switch of said commercial motor vehicle, one terminal of a stop light switch of said commercial motor vehicle, a headlight switch of said commercial motor vehicle, and one terminal of a flasher of said commerical motor vehicle, said switch lever cooperating with a first contact terminal, said first contact terminal being electrically connected to a second contact terminal, said second contact terminal being electrically connected to said clearance/marker and identification light control switch, a third contact terminal, said third contact terminal being part of said clearance/marker and identification light control switch, said third contact terminal cooperating with said second contact terminal, a fourth contact terminal, said fourth contact terminal cooperating with said third contact terminal and being electrically connected to a fifth contact terminal and a sixth contact terminal, the other terminal of said flasher being electrically connected to said sixth contact terminal, said fourth contact terminal being electrically connected to a seventh contact terminal and an eighth contact terminal, a ninth contact terminal, said ninth contact terminal cooperating with said seventh contact terminal and being electrically connected to one terminal of a pilot light bulb of said commercial motor vehicle, the other terminal of said pilot light bulb being grounded, a tenth contact terminal, said tenth contact terminal cooperating with said eithth contact terminal and being electrically connected to said ninth contact terminal, said headlight switch being electrically connected to said ninth contact terminal, said headlight switch being electrically connected to the low wattage filament of a rear lamp housing of said commercial motor vehicle, said rear lamp housing also having a high wattage filament, said low and high wattage filaments being grounded, said high wattage filament being electrically connected to an eleventh contact terminal, a twelfth contact terminal, said twelfth contact terminal cooperating with said eleventh contact terminal and being electrically connected to a filament in a front lamp housing, said front lamp housing filament being grounded, said headlight switch being electrically connected to a high/low beam control switch of said commercial motor vehicle, said high wattage filament being electrically connected to said twelfth contact terminal, the other terminal of said stop light switch being electrically connected to a thirteenth contact terminal, said thirteenth contact terminal being electrically connected to a fourteenth contact terminal, a fifteenth contact terminal, said fifteenth contact terminal being electrically connected to a filament of a front lamp housing, said filament being grounded, said third contact terminal being electrically connected to the filaments of the clearance/marker and identification lights of said commercial motor vehicle, said filaments of the clearance/marker and identification lights being grounded, a first two-position switch bridge, said first switch bridge being triangularly shaped and spanning in one position said fifth, twelfth and fifteenth contact terminals and spanning in the other position said fourteenth and twelfth contact terminals, a second two-position switch bridge, said second switch bridge being triangularly shaped and spanning in one position said sixth, twelfth and eleventh contact terminals and spanning in the other position said eleventh and thirteenth contact terminals, a third two-position switch bridge, said third switch bridge spanning in one position said seventh and ninth contact terminals and spanning in the other position said ninth contact terminal, a fourth two-position switch bridge, said fourth switch bridge spanning in one position said third and fourth contact terminals and spanning in the other position said third and second contact terminals, and a fifth two-position switch bridge, said fifth switch bridge spanning in one position said eighth and tenth contact terminals and spanning in the other position said tenth contact terminal, all of said switch bridges moving in unison and being controlled by a hazard warning switch, so that in one position of said hazard warning switch said clearance/marker and identification lights can burn steady on, and in the other position of said hazard warning switch said clearance/marker and identification lights can be intermittently flashed together with at least one other light of said commercial motor vehicle, said clearance/marker and identification lights being mounted at an elevated position on said commercial motor vehicle.

* * * * *